United States Patent
Tashiro (10) Patent No.: US 11,677,892 B2
(45) Date of Patent: Jun. 13, 2023

(54) CALCULATING COLOR DATA FOR INSPECTION BY CONVERTING NORMAL AND SPOT COLOR PRINT DATA INTO COLOR SPACE OF DECREASED COLORS AND COMBINING CONVERTED COLOR DATA

(71) Applicant: FUJIFILM Business Innovation Corp., Tokyo (JP)

(72) Inventor: Yosuke Tashiro, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/722,391

(22) Filed: Apr. 18, 2022

(65) Prior Publication Data

US 2023/0117852 A1    Apr. 20, 2023

(30) Foreign Application Priority Data

Oct. 15, 2021  (JP) .............................. JP2021-169928

(51) Int. Cl.
   *H04N 1/60*    (2006.01)
   *G06K 15/02*    (2006.01)
   *H04N 1/00*    (2006.01)

(52) U.S. Cl.
   CPC ....... *H04N 1/6005* (2013.01); *G06K 15/1878* (2013.01); *H04N 1/00005* (2013.01); *H04N 1/00023* (2013.01); *H04N 1/6008* (2013.01)

(58) Field of Classification Search
   None
   See application file for complete search history.

(56) References Cited

U.S. PATENT DOCUMENTS

| | | | | |
|---|---|---|---|---|
| 6,943,915 | B1 * | 9/2005 | Teraue | H04N 1/6052 358/1.9 |
| 7,580,150 | B2 * | 8/2009 | Mahy | H04N 1/407 347/3 |
| 7,589,864 | B2 * | 9/2009 | Teraue | H04N 1/6052 358/1.9 |
| 2020/0244839 | A1 * | 7/2020 | Hiramoto | H04N 1/54 |

FOREIGN PATENT DOCUMENTS

JP          2014134401          7/2014

* cited by examiner

*Primary Examiner* — Scott A Rogers
(74) *Attorney, Agent, or Firm* — Jciprnet (57) ABSTRACT

An image processing apparatus includes a processor configured to calculate color data for inspection by converting printing data that is data as a base of an image to be printed and includes a normal color which is a normally used color and a spot color which is a color other than the normal color, into color data of another color space in which the number of colors is decreased, for each of the printing data of the normal color and the printing data of the spot color and then, combining the color data after the conversion, and output the calculated color data for inspection.

10 Claims, 7 Drawing Sheets

CALCULATING COLOR DATA FOR INSPECTION BY CONVERTING NORMAL AND SPOT COLOR PRINT DATA INTO COLOR SPACE OF DECREASED COLORS AND COMBINING CONVERTED COLOR DATA

CROSS-REFERENCE TO RELATED APPLICATIONS

This application is based on and claims priority under 35 USC 119 from Japanese Patent Application No. 2021-169928 filed Oct. 15, 2021.

BACKGROUND

(i) Technical Field

The present invention relates to an image processing apparatus, an image inspection system, and a non-transitory computer readable medium storing a program.

(ii) Related Art

In the related art, an image inspection apparatus that inspects a printed image by comparing printing data as a base of an image to be printed with read data obtained by reading the printed image has been used.

JP2014-134401A discloses an image inspection system. This image inspection system is configured to include a client PC that outputs a print instruction to a DEF, a print server that analyzes a printer language for original image data for which the print instruction is provided, and draws the original image data, a printer that prints an inspected original document based on RIP image data acquired from the print server, an image reading apparatus that reads image data of the inspected original document printed by the printer, and the RIP image data output from the print server and RGB data (image inspection unit) related to the inspected original document read by the image reading apparatus.

SUMMARY

However, in a case of using a spot color that is a color other than a normal color in addition to the normal color that is a normally used color, a data amount of printing data transmitted to the image inspection apparatus may be excessively large. At this point, the data amount can be reduced by converting the printing data into color data of another color space. However, in a case where color conversion is performed into another color space by collectively converting the normal color and the spot color, a large amount of time is required for conversion processing, and an inspection speed may be decreased.

Aspects of non-limiting embodiments of the present disclosure relate to an image processing apparatus, an image inspection system, and a non-transitory computer readable medium storing a program that can perform color conversion into another color space faster than in a case where the color conversion is performed by collectively converting a normal color and a spot color.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image processing apparatus including a processor configured to calculate color data for inspection by converting printing data that is data as a base of an image to be printed and includes a normal color which is a normally used color and a spot color which is a color other than the normal color, into color data of another color space in which the number of colors is decreased, for each of the printing data of the normal color and the printing data of the spot color and then, combining the color data after the conversion, and output the calculated color data for inspection.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described in detail with reference to the accompanying drawings.

Overall Description of Image Inspection System

Figure 1:
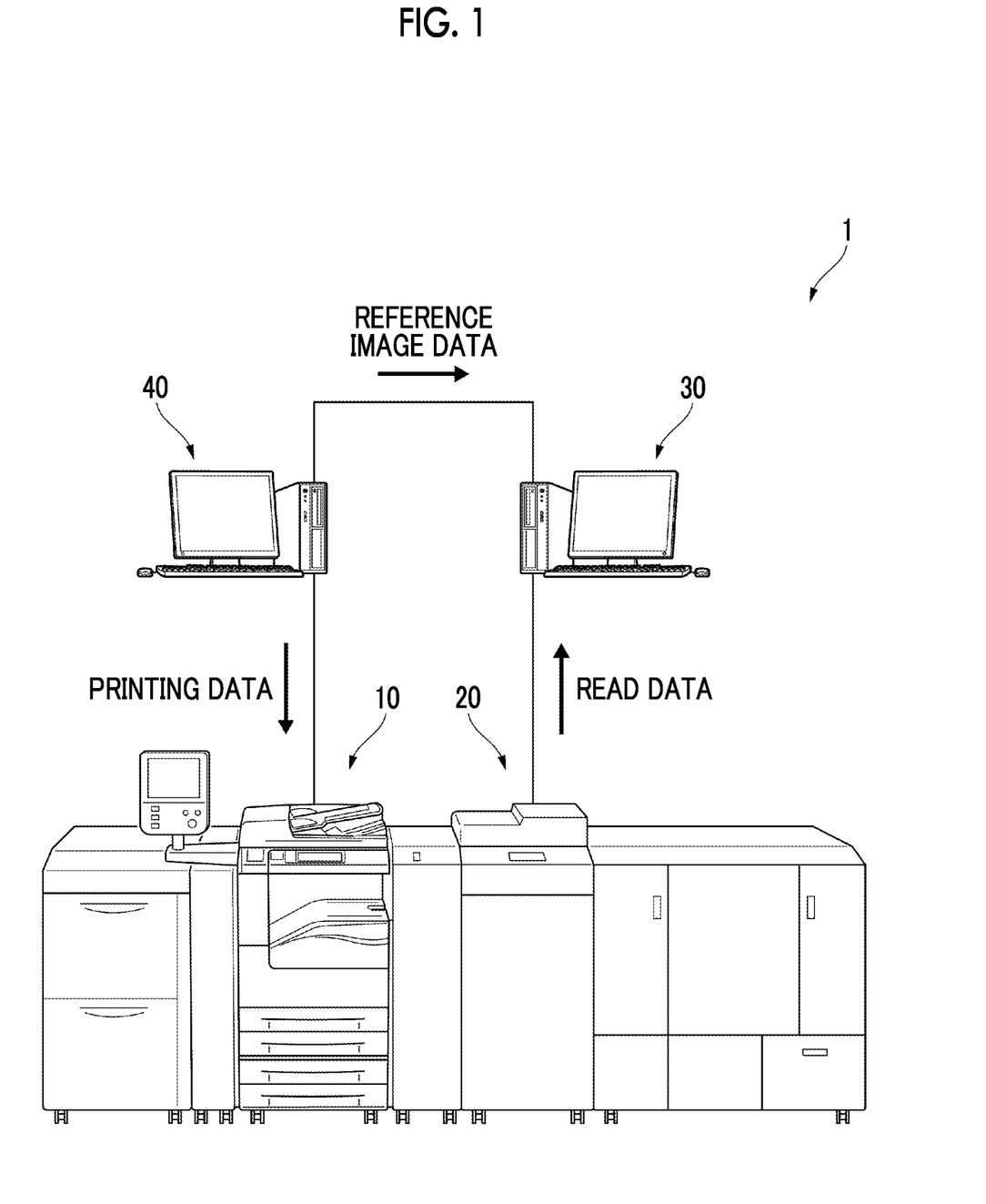
FIG. 1 is a diagram illustrating a configuration example of an image inspection system in a present exemplary embodiment.

FIG. 1 is a diagram illustrating a configuration example of an image inspection system 1 in the present exemplary embodiment.

As illustrated, the image inspection system 1 of the present exemplary embodiment includes a printing apparatus 10 that prints an image, a reading apparatus 20 that reads the printed image, an image inspection apparatus 30 that inspects the image, and an information processing apparatus 40 that creates printing data or color data for inspection.

The printing apparatus 10 is an apparatus that has a printer function of printing the image on a paper sheet which is a recording medium, and outputting the printed image as a printed document.

Figure 2:
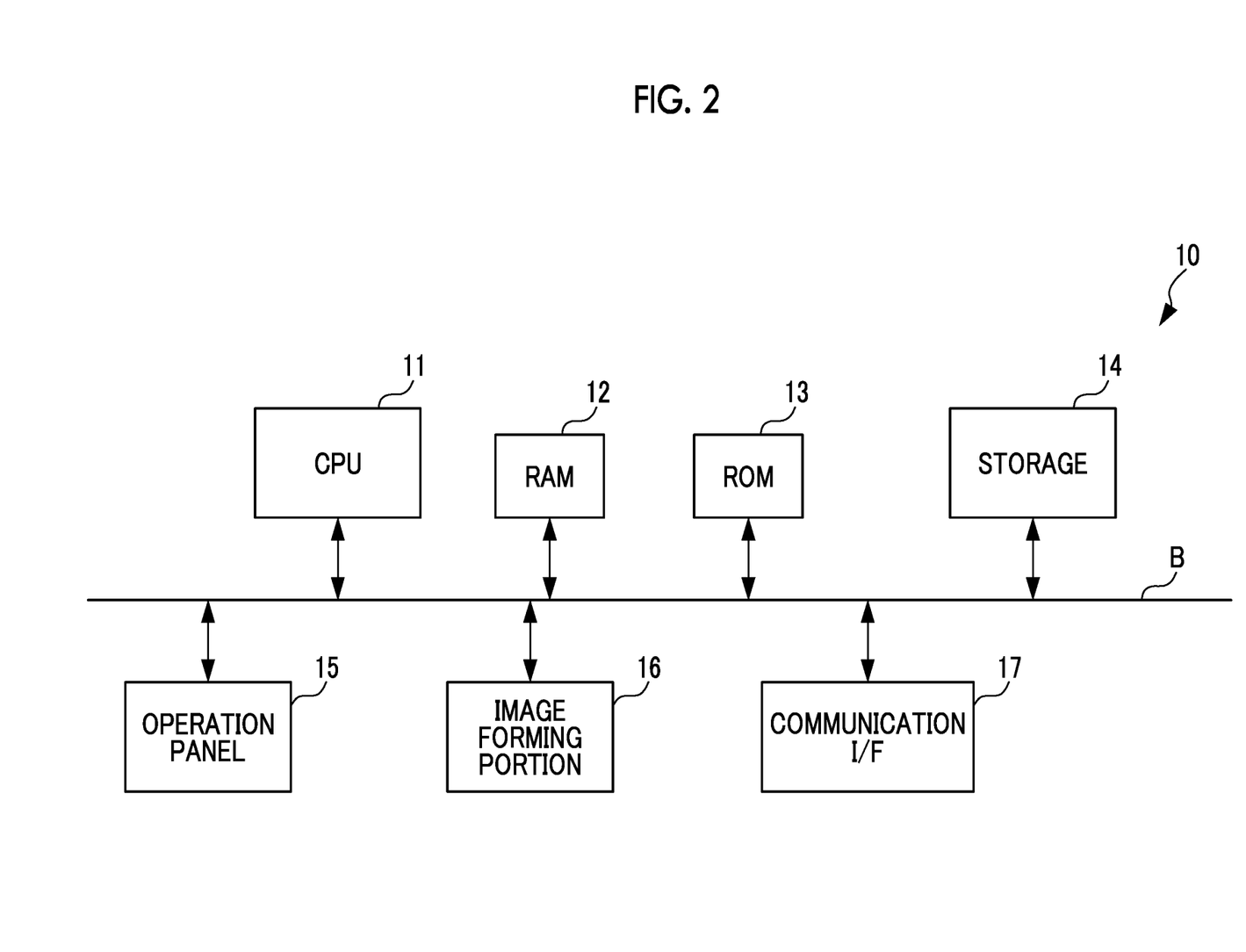
FIG. 2 is a diagram illustrating a hardware configuration example of a printing apparatus.

FIG. 2 is a diagram illustrating a hardware configuration example of the printing apparatus 10.

As illustrated, the printing apparatus 10 includes a CPU 11, a random access memory (RAM) 12, a read only memory (ROM) 13, a storage 14, an operation panel 15, an image forming portion 16, and a communication I/F 17. These components exchange necessary data through a bus B.

The CPU 11 implements each function, described later, by loading various programs stored in the ROM 13 or the like into the RAM 12 and executing the loaded various programs.

The RAM 12 is a memory used as a work memory or the like of the CPU 11.

The ROM 13 is a memory storing the various programs and the like executed by the CPU 11.

The storage 14 is a hard disk drive (HDD) or a solid state drive (SSD) and stores image information and the like used in the image forming portion 16.

The operation panel 15 is, for example, a touch panel that displays various information and receives an operation input from a user. In a case where the operation panel 15 is a touch panel, the operation panel 15 includes a display portion such as a liquid crystal panel that displays a content (information content) as an image in a predetermined region. In addition, the operation panel 15 has a function of sensing a position of contact of a contact object on the liquid crystal panel when the contact object represented by a finger of a person or a stylus pen comes into contact with the liquid crystal panel. In the present exemplary embodiment, the touch panel is not particularly limited, and touch panels of various types such as a resistive film type and an electrostatic capacitive type can be used.

The image forming portion 16 is an example of a printing mechanism that forms an image on a paper sheet. Here, the image forming portion 16 of an electrophotographic type that forms an image by transferring toner attached to a photoconductor to a paper sheet, or an ink jet type that forms an image by ejecting ink onto a paper sheet can be used.

The communication I/F 17 transmits and receives various information to and from other apparatuses.

The reading apparatus 20 reads the image printed on the paper sheet by the printing apparatus 10. The reading apparatus 20 is a so-called inline sensor and reads the image printed on the paper sheet that is being transported.

Figure 3A:
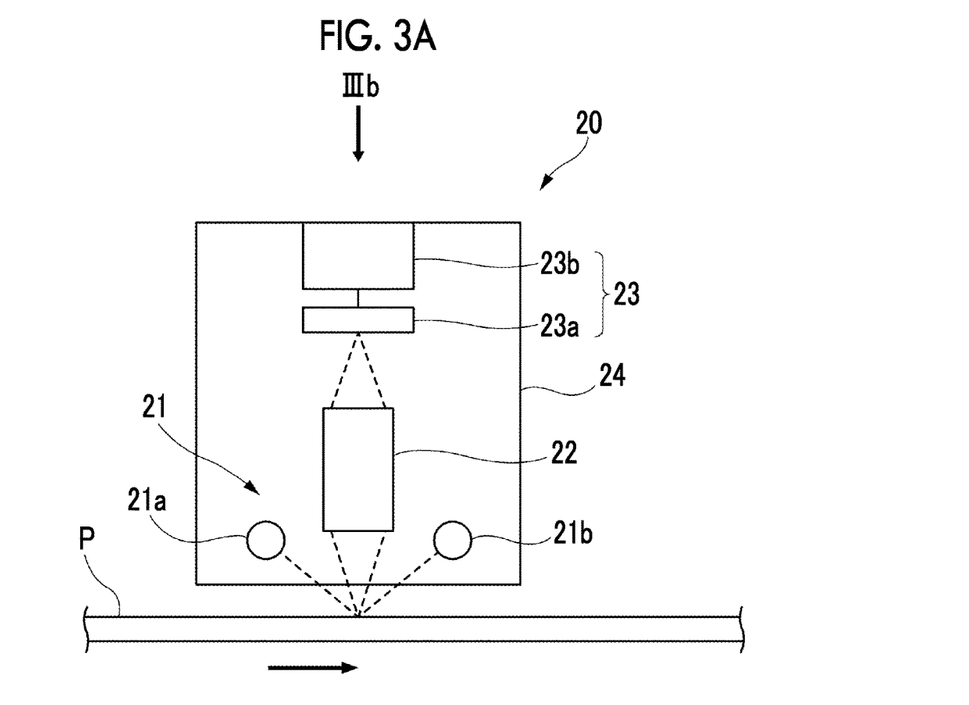
FIGS. 3A and 3B are diagrams for describing a reading apparatus.
Figure 3B:
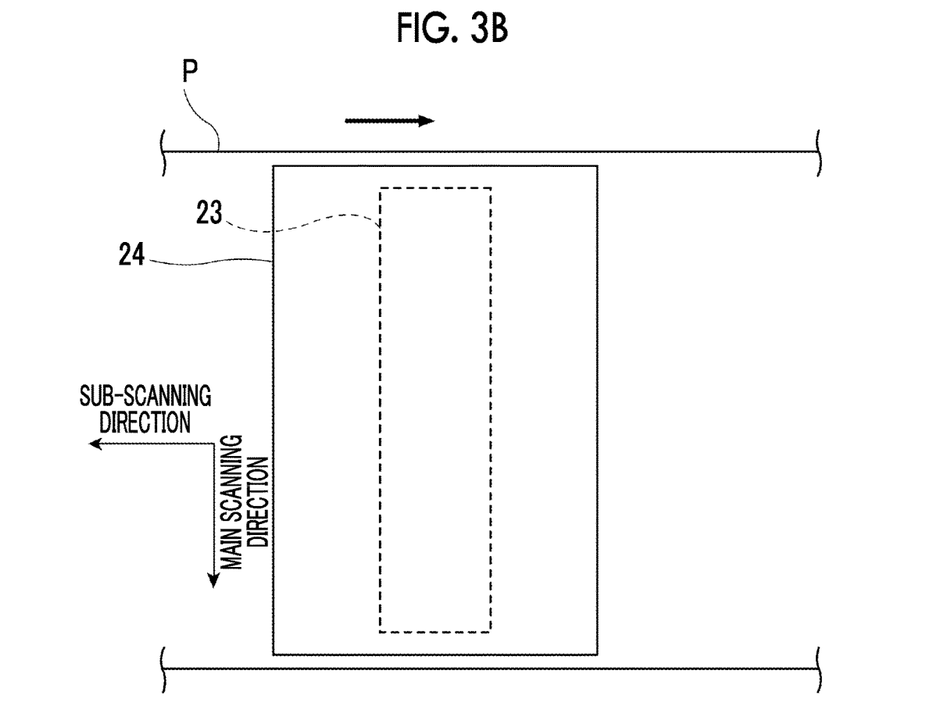

FIGS. 3A and 3B are diagrams for describing the reading apparatus 20. Here, FIG. 3A is a diagram when the reading apparatus 20 is seen from the same direction as FIG. 1. In addition, FIG. 3B is a diagram when the reading apparatus 20 is seen from a direction IIIb in FIG. 3A.

As illustrated, the reading apparatus 20 includes a light source 21, an optical system 22, a charge coupled device (CCD) sensor 23, and a housing 24.

The light source 21 irradiates a paper sheet P on which the image is formed, with light. For example, the light source 21 is configured with a pair of tungsten lamps 21a and 21b. Reflected light including information about the image is generated by irradiating the image formed on the paper sheet P with light.

The optical system 22 guides the light reflected by the image formed on the paper sheet P to the CCD sensor 23. In the present exemplary embodiment, the optical system 22 consists of a SELFOC display (SLA: registered trademark). This SELFOC display generally condenses diffuse reflected light out of the reflected light from the image and forms an image of the condensed diffuse reflected light on the CCD sensor 23.

The CCD sensor 23 receives the light guided by the optical system 22. CCDs 23a as pixels receiving the light reflected by the image are arranged in a line in the CCD sensor 23. In the present exemplary embodiment, CCDs corresponding to colors of red (R), green (G), and blue (B), respectively, are arranged in three arrays, and the image can be measured with each color of RGB. That is, the CCDs 23a are 3-line color CCDs. The CCDs 23a are arranged in a main scanning direction for each color of RGB. That is, accordingly, the image can be read in the main scanning direction. In addition, the paper sheet moves in a sub-scanning direction in accordance with the transport of the paper sheet. Accordingly, the image can be read in the sub-scanning direction. The light received by the CCDs 23a is photoelectrically converted into charges, and these charges are transferred to a read data generation portion 23b.

In the read data generation portion 23b, the charges transferred from the CCDs 23a are sensed as a sensing signal. This sensing signal is read data obtained by reading the image formed on the paper sheet. Since the CCDs 23a are color CCDs of three colors of R, G, and B, an R signal, a G signal, and a B signal are generated as read data corresponding to each color in the read data generation portion 23b.

The housing 24 is a case for accommodating the light source 21, the optical system 22, and the CCD sensor 23.

The image inspection apparatus 30 inspects the image read by the reading apparatus 20. The image inspection apparatus 30 acquires reference image data from the information processing apparatus 40 as the color data for inspection. In addition, the image inspection apparatus 30 acquires inspection image data that is the read data from the read data generation portion 23b of the reading apparatus 20. The image is inspected by comparing the reference image data with the inspection image data. This matter will be described in detail later.

The information processing apparatus 40 creates the printing data. Furthermore, the information processing apparatus 40 creates the color data for inspection that is data of the image inspected by the image inspection apparatus 30. In the present exemplary embodiment, the color data for inspection is characterized as data in which the number of colors of the printing data is decreased. This matter will also be described in detail later.

The image inspection apparatus 30 and the information processing apparatus 40 are computer apparatuses. The image inspection apparatus 30 and the information processing apparatus 40 each perform processing by operating various application software under management of an operating system (OS). The image inspection apparatus 30 and the information processing apparatus 40 include a central processing unit (CPU) that is a calculation unit, a main memory that is a storage unit, and a storage such as a hard disk drive (HDD) or a solid state drive (SSD). Here, the CPU executes various programs such as the OS and application software. In addition, the main memory is a storage region storing the various programs, data used for executing the various programs, and the like. The storage is a storage region storing input data for the various programs, output data from the various programs, and the like. Furthermore, the image inspection apparatus 30 and the information processing apparatus 40 include a communication interface for external communication. Here, the CPU is an example of a processor.

Figure 4:
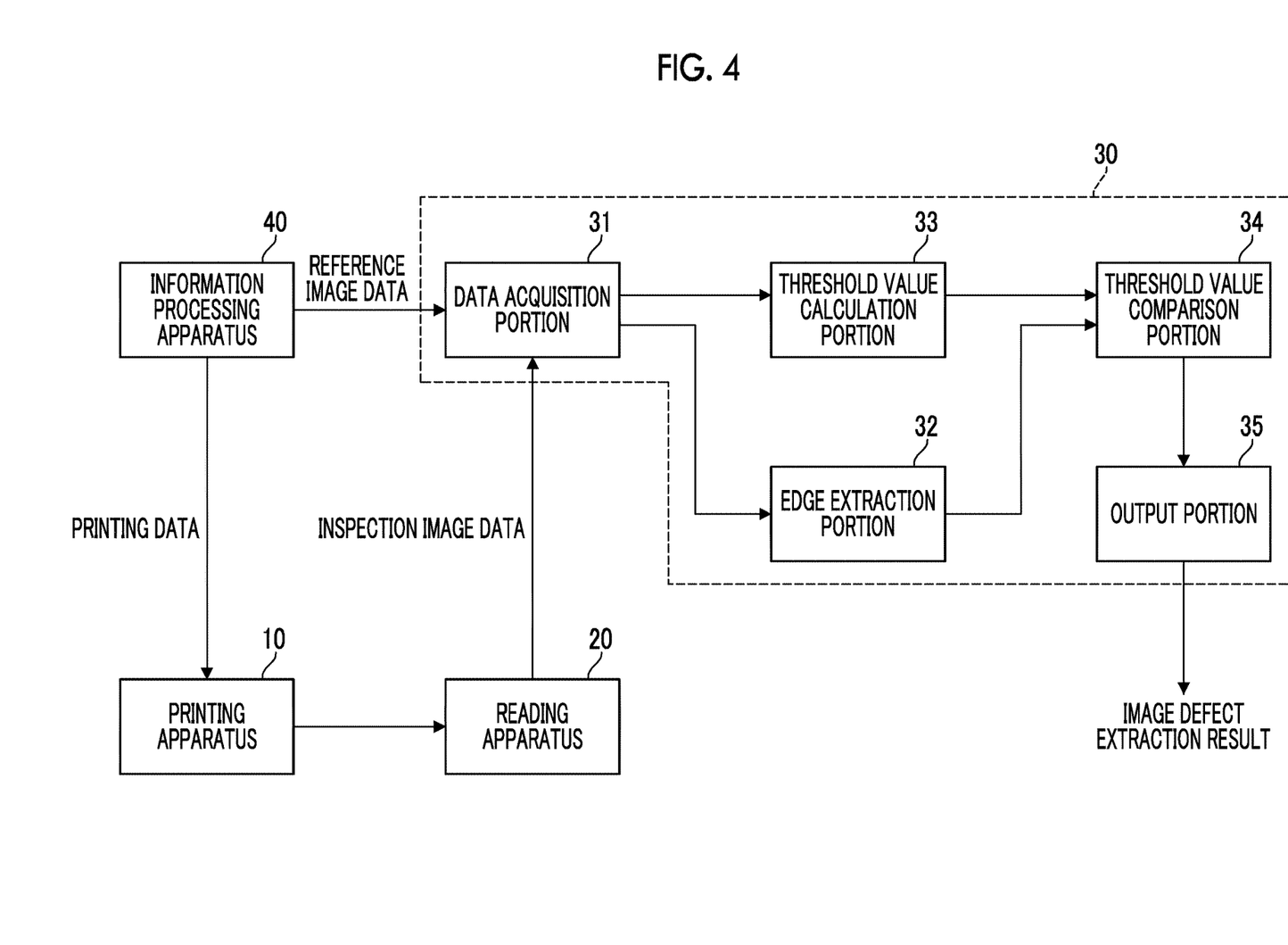
FIG. 4 is a diagram illustrating a processing flow performed in the image inspection system.

FIG. 4 is a diagram illustrating a processing flow performed in the image inspection system 1.

As illustrated, in the image inspection system 1, the information processing apparatus 40 creates the printing data for printing by the printing apparatus 10. This printing data is raster image processor (RIP) data and is color data based on color of a coloring material such as toner used in the printing apparatus 10. In the present exemplary embodiment, a spot color is used as the color of the coloring material in addition to cyan (C), magenta (M), yellow (Y), and black (K). In this case, the four colors of C, M, Y, and K correspond to a normal color that is a normally used color. On the other hand, the "spot color" is a color other than the normal color. For example, the spot color is a color such as red, pink, white, gold, or silver. In addition, colorlessness (clearness) may be used as the spot color.

Furthermore, the information processing apparatus 40 creates the reference image data as the color data for inspection for inspecting the image by the image inspection apparatus 30. As will be described in detail later, this reference image data is created based on the printing data. The reference image data is color data of another color space in which the number of colors of the printing data is decreased. For example, color data in a case of using two colors as the spot color in addition to the normal color (four colors) is total six colors. In the color data for inspection of the present exemplary embodiment, the number of colors is decreased from the six colors. For example, the color data for inspection is color data consisting of three parameters represented in the other color space. Examples of the other color space include, but not limited to, an L*a*b* color space, an XYZ color space, an L*u*v* color space, an HSV color space, and an RGB color space. The information processing apparatus 40 converts the color data of the six colors into three color data. Hereinafter, the present exemplary embodiment will be described by assuming that conversion is performed into color data of the L*a*b* color space. A conversion method at this point will be described later.

In the printing apparatus 10, printing is performed on the paper sheet based on the printing data.

The printed paper sheet is transported, and the reading apparatus 20 reads the printed image. The read data read by the reading apparatus 20 is transmitted to the image inspection apparatus 30 as inspection image data.

In the image inspection apparatus 30, a data acquisition portion 31 acquires the reference image data created by the information processing apparatus 40 and the inspection image data transmitted from the reading apparatus 20. An edge extraction portion 32 extracts an image part by performing edge extraction on the inspection image data. A difference between the reference image data and the inspection image data is calculated. In addition, a threshold value calculation portion 33 calculates a threshold value for determining an image defect based on the reference image data. This threshold value is used for determining that the image defect is not present in a case where the difference between the reference image data and the inspection image data is less than or equal to the threshold value, and determining that the image defect is present in a case where the difference exceeds the threshold value. A threshold value comparison portion 34 compares the difference between the reference image data and the inspection image data with the threshold value, and an output portion 35 outputs an image defect extraction result. Accordingly, whether or not the image defect is present in the image printed by the printing apparatus 10 can be detected. For example, this image defect is present in a case where dust is attached to the paper sheet, or a case where a dot, a streak, or the like that is originally not present occurs in the image.

Description of Information Processing Apparatus 40

Next, processing performed in the information processing apparatus 40 will be described in detail.

Figure 5:
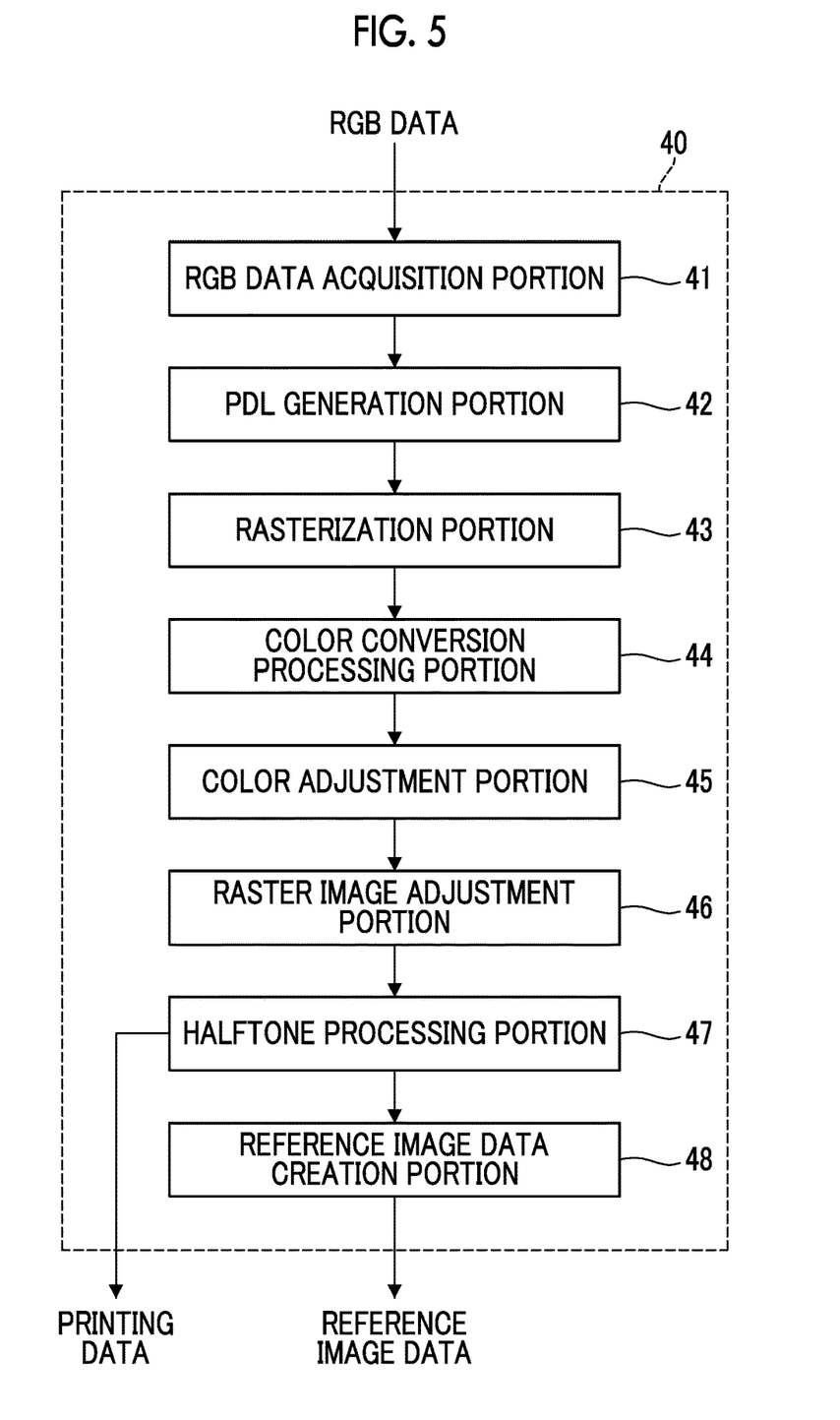
FIG. 5 is a block diagram illustrating a signal processing system in an information processing apparatus.

FIG. 5 is a block diagram illustrating a signal processing system in the information processing apparatus 40.

The information processing apparatus 40 includes an RGB data acquisition portion 41 that acquires RGB data created for outputting the image by the printing apparatus 10, a PDL generation portion 42 that receives red, green, and blue (RGB) data and converts the RGB data into a page description language (PDL), a rasterization portion 43 that creates a raster image from the PDL generated by the PDL generation portion 42, a color conversion processing portion 44 that converts the RGB data into CMYK data, a color adjustment portion 45 that adjusts color of the CMYK data, a raster image adjustment portion 46 that adjusts the raster image converted by the color adjustment portion 45, a halftone processing portion 47 that performs halftone processing, and a reference image data creation portion 48 that creates the reference image data.

In the present exemplary embodiment, first, the RGB data acquisition portion 41 receives RGB data from an external PC. This RGB data is image data that a user using the PC intends to print by the printing apparatus 10.

The RGB data is transmitted to the PDL generation portion 42. The PDL generation portion 42 converts the RGB data into code data described in PDL and outputs the code data.

The rasterization portion 43 converts the code data that is output from the PDL generation portion 42 and is described in PDL, into raster data for each pixel as a raster image.

The color conversion processing portion 44 converts the raster data input from the rasterization portion 43 into CMYK data and spot color data that are reproduction colors (CMYK and the spot color that are the color of toner which is a coloring material) of the printing apparatus 10, and outputs the CMYK data and the spot color data. This CMYK data consists of C color data, M color data, Y color data, and K color data separated for each color. In addition, the spot color data consists of color data that is separated for each color used as the spot color.

The color adjustment portion 45 functions as a color adjustment unit that adjusts color of the image to be formed by the printing apparatus 10. The color adjustment portion 45 adjusts the color of the CMYK data and the spot color data to target color that is to be originally output by the printing apparatus 10.

The raster image adjustment portion 46 performs various adjustments for obtaining more favorable image quality by the printing apparatus 10, by performing γ conversion, definition processing, middle tone processing, or the like on the CMYK data and the spot color data output from the color adjustment portion 45.

The halftone processing portion 47 performs halftone processing on the printing data by performing dither mask processing using a dither mask having predetermined threshold value arrays in the main scanning direction and the sub-scanning direction. Accordingly, for example, the printing data is changed from printing data represented by multiple values to printing data represented by two values.

The reference image data creation portion 48 creates the reference image data that is the color data for inspection. The reference image data creation portion 48 converts the color data of CMYK and the spot color into color data of the L*a*b* color space. That is, in the reference image data creation portion 48, three color data of L*a*b* are created based on the color data of CMYK and the spot color.

Description of Reference Image Data Creation Portion 48

Next, a method of creating the reference image data as the color data for inspection by the reference image data creation portion 48 will be described in detail.

Figure 6:
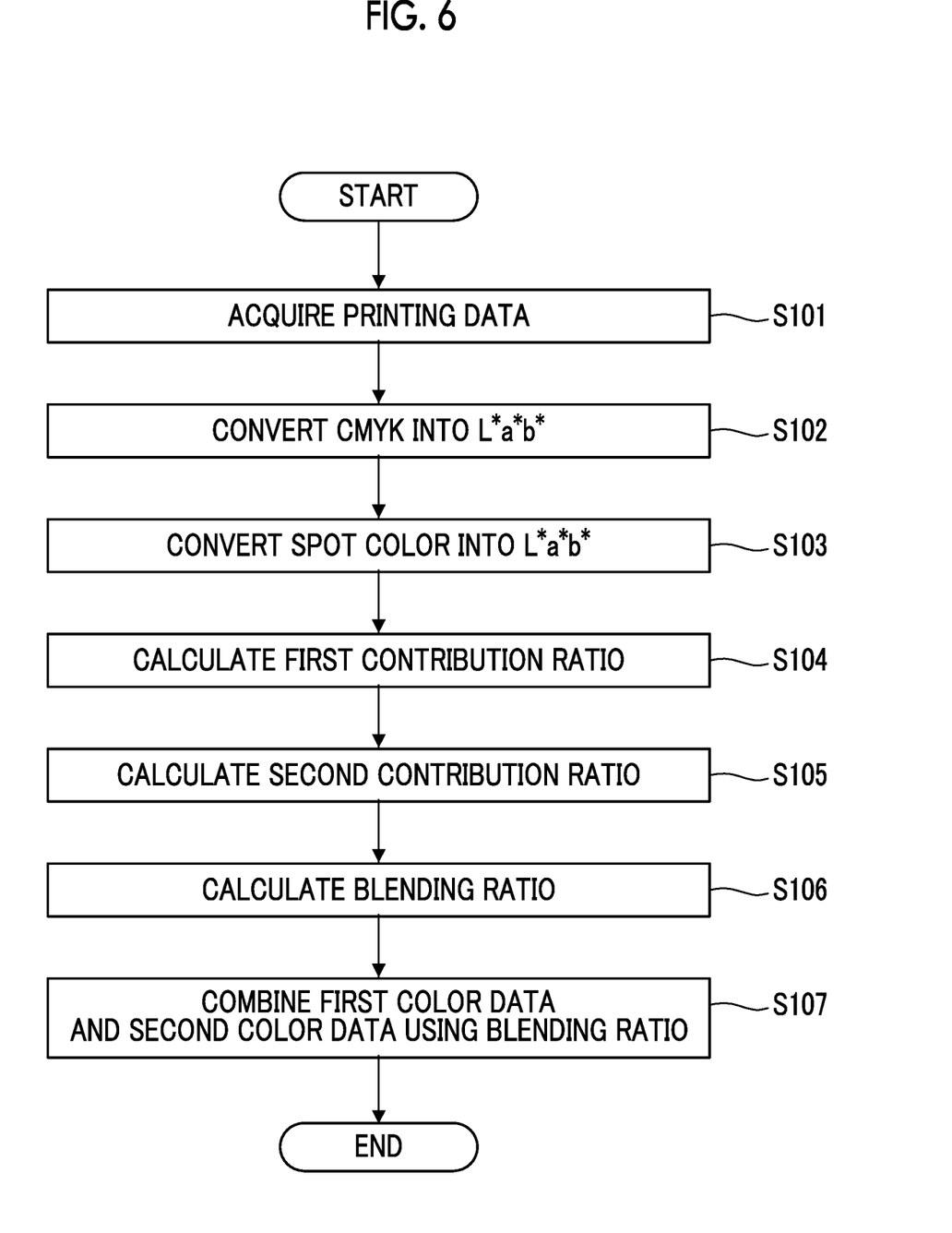
FIG. 6 is a flowchart illustrating processing of creating reference image data by a reference image data creation portion.
Figure 7:
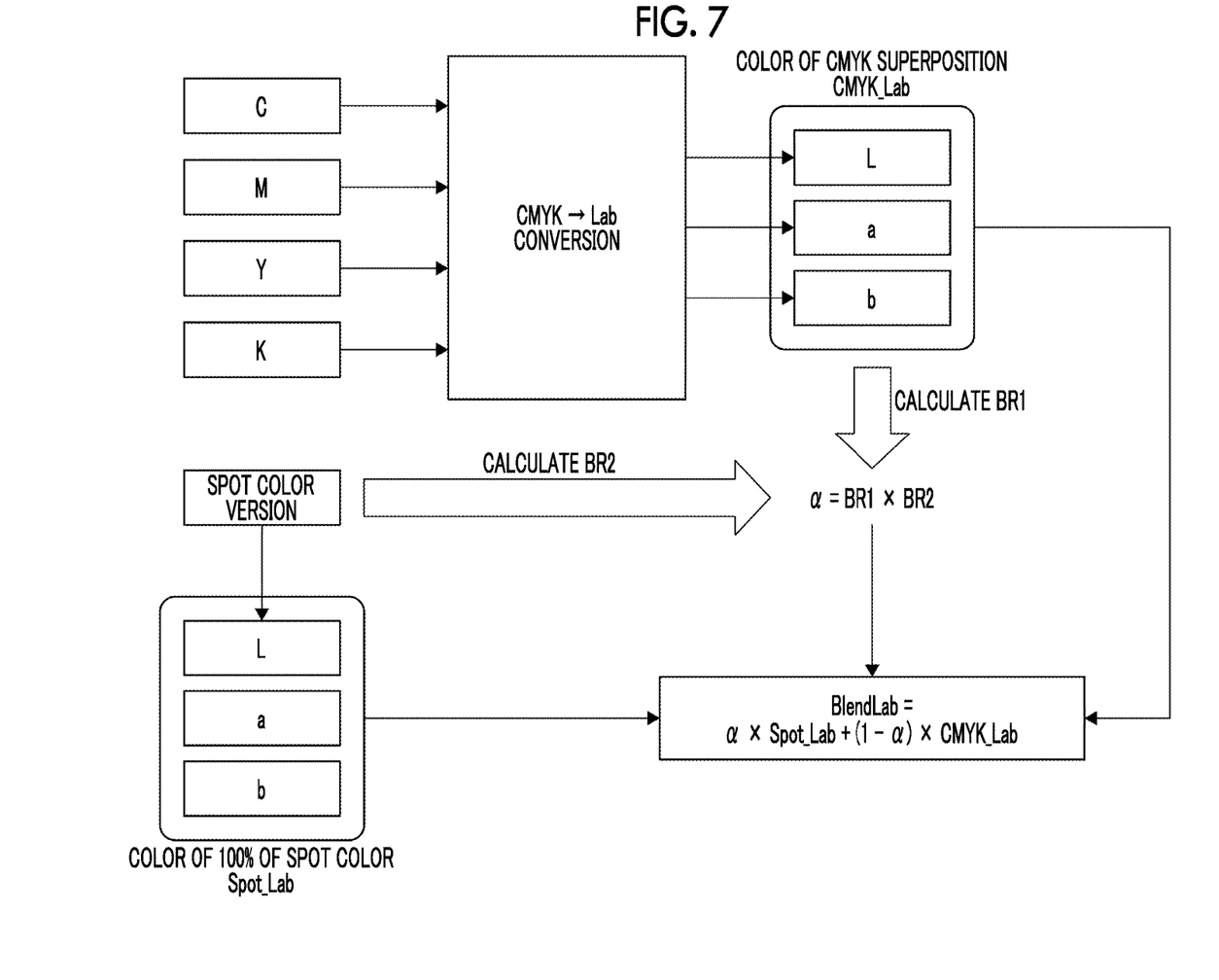
FIG. 7 is a diagram illustrating a transition of color data in creating color data for inspection by the reference image data creation portion.

FIG. 6 is a flowchart illustrating processing of creating the reference image data by the reference image data creation portion 48. In addition, FIG. 7 is a diagram illustrating a transition of color data in creating the color data for inspection by the reference image data creation portion 48.

First, the reference image data creation portion 48 acquires the color data of CMYK and the spot color that is the printing data from the halftone processing portion 47 (step S101).

Next, the reference image data creation portion 48 converts the color data of CMYK into color data of L*a*b* (step S102). Furthermore, the reference image data creation portion 48 converts the color data of the spot color into color data of L*a*b* (step S103). This conversion can be said to be conversion of each of the printing data of the normal color and the printing data of the spot color into color data of the L*a*b* color space as the other color space in which the number of colors is decreased.

Hereinafter, the color data of the L*a*b* color space into which the printing data of the normal color is converted may be referred to as first color data. The color data of the L*a*b* color space into which the printing data of the spot color is converted may be referred to as second color data.

The reference image data creation portion 48 calculates a first contribution ratio BR1 that is a degree of influence of the spot color on the image, based on the first color data (step S104). The first contribution ratio BR1 is an example of a contribution ratio of the spot color to the image and represents the degree of influence in a case where the spot color is added in addition to the normal color. That is, in a case where an image formed with the normal color is a high-chroma or dark image, the spot color is considered to be unlikely to be reflected on the image even in a case where the spot color is added. In this case, the contribution ratio of the spot color to the image is low. That is, an effect when the spot color is added in addition to the normal color is low. On the other hand, in a case where the image formed with the normal color is a low-chroma or bright image, the spot color is considered to be reflected on the image to a greater extent when the spot color is added. In this case, the contribution ratio of the spot color to the image is high. That is, the effect when the spot color is added in addition to the normal color is high. Thus, the first contribution ratio BR1 is obtained based on lightness and chroma of the first color data. In actuality, the first contribution ratio BR1 is obtained by conducting an experiment or the like in advance based on lightness and chroma of the image.

Furthermore, the reference image data creation portion 48 calculates a second contribution ratio BR2 that represents a ratio of use of the spot color, based on the printing data of the spot color (step S105). The second contribution ratio BR2 is an example of the contribution ratio of the spot color to the image and represents a ratio at which the spot color is used. That is, when a larger amount of the coloring material of the normal color is used, the spot color is considered to be unlikely to be reflected on the image even in a case where the spot color is added. That is, the effect when the spot color is added in addition to the normal color is low. On the other hand, when the coloring material of the normal color is not much used in the image formed with the normal color, the spot color is considered to be reflected on the image to a greater extent when the spot color is added. In this case, the contribution ratio of the spot color to the image is high. That is, the effect when the spot color is added in addition to the normal color is high. Thus, the second contribution ratio BR2 may be said to be a coverage (coloring material coverage ratio) of the spot color. The second contribution ratio BR2 is not limited to a case of the coverage of the spot color and may be another value corresponding to the coverage of the spot color. For example, in a case where the coverage of the spot color is 50%, the second contribution ratio BR2 may be 0.5 (50%) or may be set to 0.7.

The reference image data creation portion 48 calculates a blending ratio α from the first contribution ratio BR1 and the second contribution ratio BR2 (step S106). This blending ratio α represents the degree of influence of the spot color to the image. The blending ratio α is calculated as a product of the first contribution ratio BR1 and the second contribution ratio BR2 as elements. In FIG. 7, the blending ratio α is obtained as a simple product of the first contribution ratio BR1 and the second contribution ratio BR2. That is, the blending ratio α is obtained by Expression (1) below. A correction coefficient, a weight, or the like may be added as other elements.

$$\alpha = BR1 \times BR2 \tag{1}$$

Next, the reference image data creation portion 48 calculates the reference image data by combining the first color data with the second color data. Specifically, the reference image data creation portion 48 creates the reference image data by combining the first color data with the second color data using the blending ratio α (step S107). Here, the reference image data creation portion 48 combines the first color data with the second color data by alpha blending using the blending ratio a. In FIG. 7, reference image data BlendLab is obtained by Expression (2) below. Here, CMYK_Lab is the first color data, and Spot_Lab is the second color data.

$$BlendLab = \alpha \times Spot\_Lab + (1-\alpha) \times CMYK\_Lab \tag{2}$$

The reference image data creation portion 48 outputs the calculated reference image data BlendLab to the image inspection apparatus 30.

Modification Example

The reference image data BlendLab that is the color data for inspection may be changed depending on an order of printing the normal color and the spot color. The degree of influence of the spot color on the image varies depending on an order of depositing the toner of the normal color and the spot color on the paper sheet. Therefore, at least one of the first contribution ratio or the second contribution ratio is changed depending on the order of depositing the toner of the normal color and the spot color on the paper sheet. Alternatively, a method of applying a correction coefficient or a weight to at least one of the first contribution ratio or the second contribution ratio in Expression (1) may be applied. This method can be said to be a method of changing the reference image data BlendLab by converting the printing data of the normal color into color data of the other color space and adding the degree of influence of the spot color on the image based on the color data after the conversion.

EXAMPLES

Hereinafter, the processing performed by the reference image data creation portion 48 will be described in further detail using examples. The present invention is not limited to these examples without departing from the gist of the present invention.

Example 1

Toner of a white color is used as the spot color in addition to the toner of each color of CMYK that is the normal color. Color data in a case where the coverage of the toner of the white color is 100% is (L*a*b*)=(90, 0, 0).

In a case where the coverage of the toner of each color of CMYK is (C, M, Y, K)=(0, 0, 0, 0), and the toner of the white color is deposited with a coverage of 100% on a location of $(L^*, a^*, b^*)=(95, 0, 0)$, the first contribution ratio BR1 with respect to $L^*=95$ is BR1=1.0. In addition, the second contribution ratio BR2 is BR2=1.0. At this point, the blending ratio α is a=1.0. Consequently, as the reference image data BlendLab, $L^*=1.0\times 90+0\times 15=90$ is satisfied, and each of a* and b* is 0. The reference image data BlendLab is $(L^*, a^*, b^*)=(90, 0, 0)$.

Example 2

Toner of a white color is used as the spot color in addition to the toner of each color of CMYK that is the normal color. Color data in a case where the coverage of the toner of the white color is 100% is $(L^*a^*b^*)=(90, 0, 0)$ in the same manner as in Example 1.

In a case where the coverage of the toner of each color of CMYK is $(C, M, Y, K)=(0, 0, 0, 100)$, and the toner of the white color is deposited with a coverage of 100% on a location of $(L^*, a^*, b^*)=(15, 0, 0)$, the first contribution ratio BR1 with respect to $L^*=15$ is BR1=0.3. In addition, the second contribution ratio BR2 is BR2=1.0. At this point, the blending ratio α is a=0.3. Consequently, as the reference image data BlendLab, $L^*=0.3\times 90+0.7\times 15=37.5$ is satisfied, and each of a* and b* is 0. Thus, the reference image data BlendLab is $(L^*, a^*, b^*)=(37.5, 0, 0)$.

Example 3

Toner of a red color is used as the spot color in addition to the toner of each color of CMYK that is the normal color. Color data in a case where the coverage of the toner of the red color is 100% is $(L^*a^*b^*)=(50, 30, 40)$.

In a case where the coverage of the toner of each color of CMYK is $(C, M, Y, K)=(0, 0, 50, 0)$, and the toner of the red color is deposited with a coverage of 100% on a location of $(L^*, a^*, b^*)=(85, 0, 60)$, the first contribution ratio BR1 with respect to $(L^*, a^*, b^*)=(85, 0, 60)$ is BR1=0.7. In addition, the second contribution ratio BR2 is BR2=1.0. At this point, the blending ratio α is a=0.7. Consequently, as the reference image data BlendLab, $L^*=0.7\times 50+0.3\times 85=60.5$, $a^*=0.7\times 30+0.3\times 0=21.0$, and $b^*=0.7\times 40+0.3\times 60=46.0$ are satisfied. Thus, the reference image data BlendLab is $(L^*, a^*, b^*)=(60.5, 21.0, 46.0)$.

Example 4

Toner of a pink color is used as the spot color in addition to the toner of each color of CMYK that is the normal color. Color data in a case where the coverage of the toner of the pink color is 100% is $(L^*a^*b^*)=(70, 70, 0)$.

In a case where the coverage of the toner of each color of CMYK is $(C, M, Y, K)=(100, 0, 0, 0)$, and the toner of the pink color is deposited with a coverage of 70% on a location of $(L^*, a^*, b^*)=(60, -30, -50)$, the first contribution ratio BR1 with respect to $(L^*, a^*, b^*)=(60, -30, -50)$ is BR1=0.5, and the second contribution ratio BR2 is BR2=0.5. At this point, the blending ratio α is α=0.25. Consequently, as the reference image data BlendLab, $L^*=0.25\times 70+0.75\times 60=62.5$, $a^*=0.25\times 70+0.75\times (-30)=-5.0$, and $b^*=0.25\times 0+0.75\times (-50)=-37.5$ are satisfied. Thus, the reference image data BlendLab is $(L^*, a^*, b^*)=(62.5, -5.0, -37.5)$.

In the related art, in a case of transmitting the printing data in which the spot color is added in addition to the normal color from the information processing apparatus 40 to the image inspection apparatus 30, a data amount of the printing data is increased in accordance with the number of colors of the spot color with respect to the four colors of YMCK that is the normal color. For example, in a case of two spot colors, the printing data to be transmitted corresponds to six colors, and the data amount of the printing data is increased by a factor of 1.5. That is, since an amount of transfer time of the printing data is increased by a factor of 1.5, an inspection speed is affected, and the increase acts as a cause of decreasing the inspection speed.

In the present exemplary embodiment, in the information processing apparatus 40, this concern is avoided by converting the printing data in which the spot color is added in addition to the normal color into color data in which the number of colors is decreased, and transmitting the color data after the conversion to the image inspection apparatus 30. This color data consists of, for example, three parameters. Thus, the amount of transfer time of the printing data is small. However, for example, in a case of converting the printing data corresponding to the six colors using a direct look up table (DLUT) that is a multidimensional table, an amount of conversion time is increased. Consequently, the increase acts as a cause of decreasing the inspection speed.

Thus, in the present exemplary embodiment, as described above, each of the printing data of the normal color and the printing data of the spot color is converted into color data of the other color space in which the number of colors is decreased. In the exemplary embodiment, the printing data of CMYK+spot color is converted into color data of the $L^*a^*b^*$ color space. After the conversion, the reference image data BlendLab is calculated by combining the color data using the blending ratio a. Accordingly, the amount of conversion time is small, and the concern of decreasing the inspection speed is avoided.

Description of Program

Here, processing performed by the information processing apparatus 40 in the present exemplary embodiment described above is implemented by cooperation between software and hardware resources. That is, a CPU inside a control computer provided in the information processing apparatus 40 implements each function of the information processing apparatus 40 by executing a program for implementing each function.

Thus, in the present exemplary embodiment, the processing performed by the information processing apparatus 40 is perceived as a program causing a computer to implement a function of calculating color data for inspection by converting printing data that is data as a base of an image to be printed and includes a normal color which is a normally used color and a spot color which is a color other than the normal color, into color data of another color space in which the number of colors is decreased, for each of the printing data of the normal color and the printing data of the spot color and then, combining the color data after the conversion, and a function of outputting the calculated color data for inspection.

The program implementing the present exemplary embodiment can be not only provided by communication means but also provided by storing the program in a recording medium such as a CD-ROM.

While the present exemplary embodiment is described above, the technical scope of the present invention is not limited to the scope disclosed in the exemplary embodiment. As is apparent from the disclosure of the claims, the above exemplary embodiment to which various modifications or improvements are carried out also fall in the technical scope of the present invention.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
 a processor configured to:
   calculate color data for inspection by converting printing data that is data as a base of an image to be printed and includes a normal color which is a normally used color and a spot color which is a color other than the normal color, into color data of another color space in which the number of colors is decreased, for each of the printing data of the normal color and the printing data of the spot color and then, combining the color data after the conversion; and
   output the calculated color data for inspection.

2. The image processing apparatus according to claim 1, wherein the processor is configured to:
 calculate the color data for inspection by
   converting the printing data of the normal color into first color data that is the color data of the other color space,
   converting the printing data of the spot color into second color data that is the color data of the other color space, and
   combining the first color data with the second color data using a blending ratio that represents a degree of influence of the spot color on the image.

3. The image processing apparatus according to claim 2, wherein the processor is configured to:
 calculate the blending ratio by
   calculating a first contribution ratio that is the degree of influence of the spot color on the image, based on the first color data,
   calculating a second contribution ratio that represents a ratio of use of the spot color, based on the printing data of the spot color, and
   calculating the blending ratio from the first contribution ratio and the second contribution ratio.

4. The image processing apparatus according to claim 3, wherein the first contribution ratio is obtained based on lightness and chroma of the first color data.

5. The image processing apparatus according to claim 3, wherein the blending ratio is calculated as a product of the first contribution ratio and the second contribution ratio as elements.

6. The image processing apparatus according to claim 2, wherein the processor is configured to:
 combine the first color data with the second color data by alpha blending using the blending ratio.

7. The image processing apparatus according to claim 1, wherein the color data for inspection is changed depending on an order of printing the normal color and the spot color.

8. The image processing apparatus according to claim 7, wherein the color data for inspection is changed by converting the printing data of the normal color into the color data of the other color space and adding a degree of influence of the spot color on the image based on the color data after the conversion.

9. An image inspection system comprising:
 a printing apparatus that prints an image on a paper sheet;
 a reading apparatus that reads the image printed on the paper sheet by the printing apparatus;
 an inspection apparatus that inspects the image read by the reading apparatus; and
 an information processing apparatus that creates color data for inspection which is data of the image inspected by the inspection apparatus,
 wherein the information processing apparatus includes a processor configured to:
   calculate color data for inspection by converting printing data that is data as a base of an image to be printed and includes a normal color which is a normally used color and a spot color which is a color other than the normal color, into color data of another color space in which the number of colors is decreased, for each of the printing data of the normal color and the printing data of the spot color and then, combining the color data after the conversion, and
   output the calculated color data for inspection.

10. A non-transitory computer readable medium storing a program causing a computer to implement:
 a function of calculating color data for inspection by converting printing data that is data as a base of an image to be printed and includes a normal color which is a normally used color and a spot color which is a color other than the normal color, into color data of another color space in which the number of colors is decreased, for each of the printing data of the normal color and the printing data of the spot color and then, combining the color data after the conversion; and
 a function of outputting the calculated color data for inspection.

* * * * *